US007085557B2

(12) United States Patent
Lai et al.

(10) Patent No.: US 7,085,557 B2
(45) Date of Patent: Aug. 1, 2006

(54) NETWORK-BASED WIRELESS TELEPHONE COMMUNICATION DEVICE

(75) Inventors: Chang-Chin Lai, Taipei (TW); Hsiao-Han Huang, Taipei (TW)

(73) Assignee: Inventec Corporation, Taipei (TW)

( * ) Notice: Subject to any disclaimer, the term of this patent is extended or adjusted under 35 U.S.C. 154(b) by 248 days.

(21) Appl. No.: 10/696,201

(22) Filed: Oct. 28, 2003

(65) Prior Publication Data

US 2005/0090238 A1    Apr. 28, 2005

(51) Int. Cl.
*H04M 3/42* (2006.01)
(52) U.S. Cl. .................. 455/416; 455/567; 455/415; 455/417; 455/566; 455/552.1; 455/462; 455/553.1; 345/727; 345/704
(58) Field of Classification Search ............... 455/416, 455/562, 415, 412, 566, 552.1, 462, 553.1; 345/227, 204
See application file for complete search history.

(56) References Cited

U.S. PATENT DOCUMENTS

2002/0054072 A1* 5/2002 Hayes-Roth ............... 345/727
2003/0125927 A1* 7/2003 Seme .......................... 704/3
2003/0153364 A1* 8/2003 Osann, Jr. ................... 455/567
2004/0132485 A1* 7/2004 Charney et al. ........ 455/552.1

* cited by examiner

*Primary Examiner*—Joseph Feild
*Assistant Examiner*—David Nguyen
(74) *Attorney, Agent, or Firm*—Fulbright & Jaworski LLP

(57) ABSTRACT

A network-based wireless telephone communication device is proposed, which can be either an independent device or integrated to a portable information platform, and which is capable of providing an interactive multi-person voice communication session for the user to talk with one or more other persons via voice over a network system, such as the Internet, through a wireless network interface. The proposed network-based wireless telephone communication device is more advantageous to use than prior art in that it utilizes the Internet for voice data transmission and therefore is significantly more economical to use than mobile phone. Moreover, since the proposed network-based wireless telephone communication device can be either an independent device or integrated to a portable information platform, such as mobile phone, electronic dictionary, PDA, or the like, it has a higher level of portability than notebook computer with wireless linking capability.

11 Claims, 2 Drawing Sheets

NETWORK-BASED WIRELESS TELEPHONE COMMUNICATION DEVICE

BACKGROUND OF THE INVENTION

1. Field of the Invention

This invention relates to wireless telephony technology, and more particularly, to a network-based wireless telephone communication device, which can be either an independent device or integrated to a portable information platform, such as a mobile phone, an electronic dictionary, a PDA (Personal Digital Assistant, or the like, and which is capable of providing an interactive multi-person voice communication session for the user to talk with one or more other persons via voice over a network system, such as the Internet, through a wireless network interface, such as a WLAN (Wireless Local Area Network) interface.

2. Description of Related Art

With the advancement in wireless communication technologies, people are now able to use portable telephone devices, such as mobile phones, to talk with other persons while on the road or in outdoors. Mobile phones are typically very small in size and light in weight, and thus have a very high level of portability on the road. One disadvantage of the mobile phone, however, is that it is quite expensive to use.

One solution to the foregoing problem is to use a portable computer unit, such as a notebook computer, that is equipped with a wireless network interface, such as WLAN (Wireless Local Area Network) interface, for linking to the Internet via a wireless network access point, and then use an instant interactive conferencing program, such as ICQ, MSN Messenger, or Yahoo Messenger, for linking to each callee's network-linked voice communication platform, such as mobile phone, notebook computer, or desktop computer. This allows the user to utilize his/her notebook computer to carry out a wireless interactive multi-person voice communication session via with one or more persons.

One drawback to the use of notebook computer for wireless telephone communication, however, is that notebook computer is considerably large in size and weight than mobile phone, and therefore has a significantly lower level of portability on the road than mobile phone.

SUMMARY OF THE INVENTION

It is therefore an objective of this invention to provide a network-based wireless telephone communication device which represents an economical solution to wireless telephone communication.

It is another objective of this invention to provide a network-based wireless telephone communication device which has a higher level of portability than notebook computer and is capable of allowing the user to carry out wireless telephone communication via the Internet.

The network-based wireless telephone communication device according to the invention can be either an independent device or integrated to a portable information platform, such as a mobile phone, an electronic dictionary, a PDA (Personal Digital Assistant, or the like, and which is capable of providing an interactive multi-person voice communication session for the user to talk with one or more other persons via voice over a network system, such as the Internet, through a wireless network interface, such as a WLAN (Wireless Local Area Network) interface.

The network-based wireless telephone communication device according to the invention is more advantageous to use than prior art in that since the invention utilizes the Internet for voice data transmission, it is significantly more economical to use than mobile phone. Moreover, since the network-based wireless telephone communication device of the invention can be either an independent device or integrated to a portable information platform, such as mobile phone, electronic dictionary, PDA, or the like, it has a higher level of portability than notebook computer with wireless linking capability.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The network-based wireless telephone communication device according to the invention is disclosed in full details by way of preferred embodiments in the following with reference to the accompanying drawings.

Figure 1:
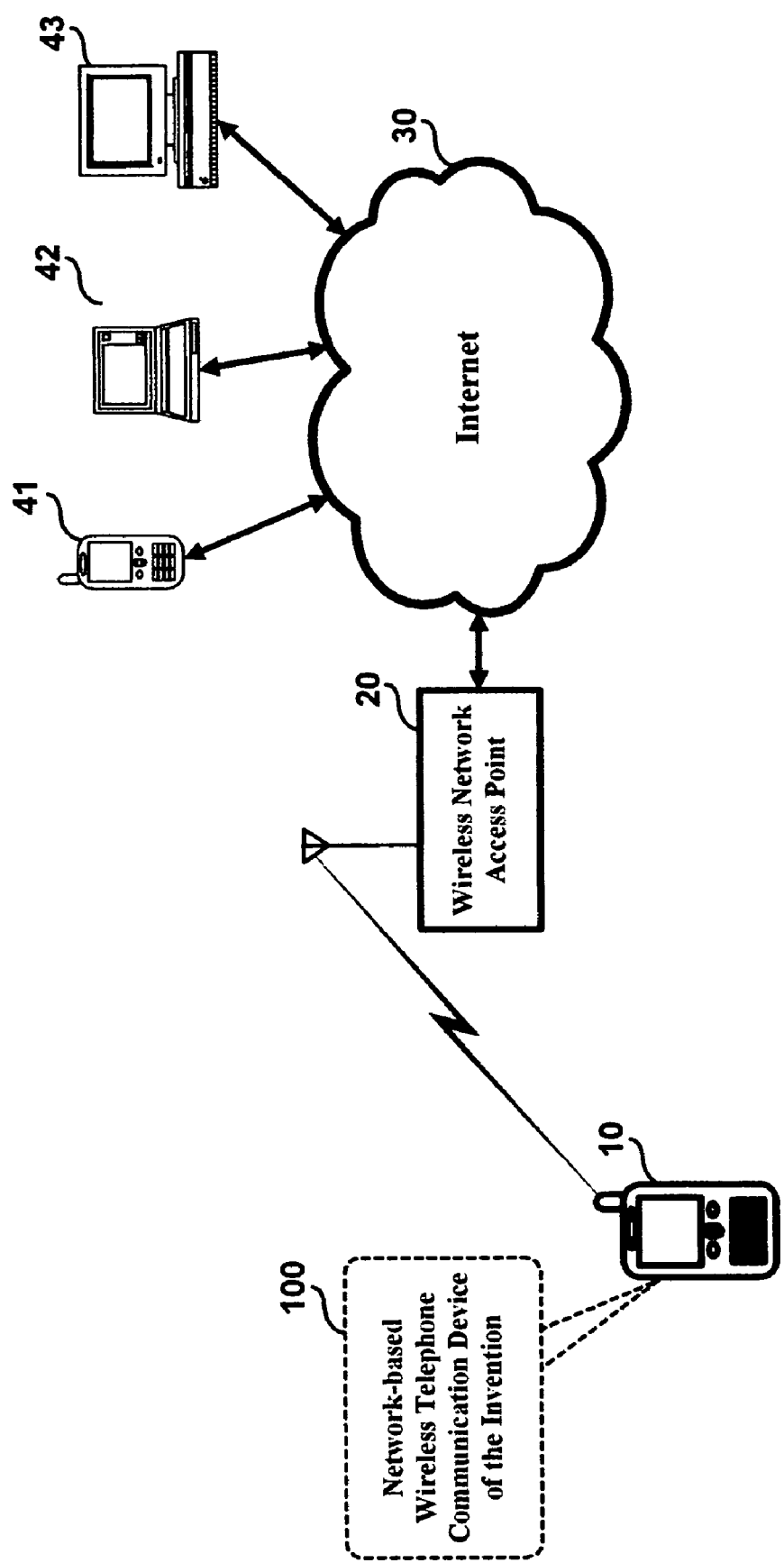
FIG. 1 is a schematic diagram showing the application of the network-based wireless telephone communication device according to the invention.

FIG. 1 is a schematic diagram showing the application of the network-based wireless telephone communication device of the invention 100. In practical implementation, the network-based wireless telephone communication device of the invention 100 can be either an independent device or integrated to a portable information platform 10, such as a mobile phone, an electronic dictionary, a PDA (Personal Digital Assistant), or the like, for the purpose of allowing the user to carry out an interactive multi-person voice communication session within the hot spot (i.e., wireless coverage) of a wireless network access point 20 via a network system 30, such as the Internet, with one or more remotely-located persons having network-linked voice communication platforms, such as a mobile phone 41, a notebook computer 42, or a desktop computer 43. The interactive multi-person voice communication session allows the user to talk concurrently with these remotely-located persons in a two-way interactive manner.

Figure 2:
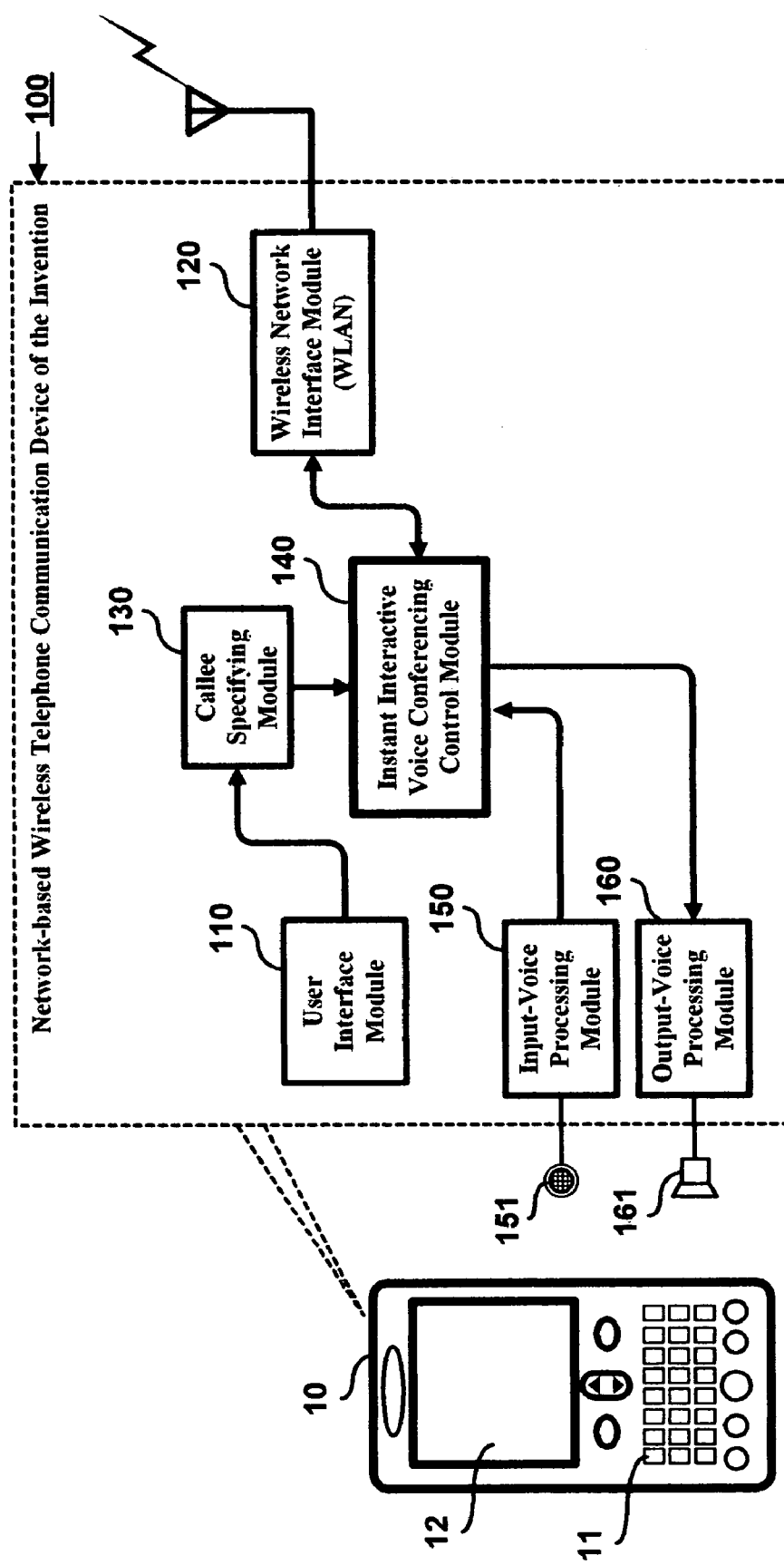
FIG. 2 is a schematic diagram showing an object-oriented component model for the network-based wireless telephone communication device according to the invention.

As shown in FIG. 2, the object-oriented component model of the network-based wireless telephone communication device of the invention 100 comprises: (a) a user interface module 110; (b) a wireless network interface module 120; (c) a callee specifying module 130; (d) an instant interactive voice conferencing control module 140; (e) an input-voice processing module 150; and (f) an output-voice processing module 160.

The user interface module 110 is functionally related to the keypad 11 and the display screen 12 (or equivalent input/output devices) on the portable information platform 10, which allows the user to activate the network-based wireless telephone communication device of the invention 100 for an interactive multi-person voice communication session and specifying related settings.

The wireless network interface module 120 is, for example, a WLAN (Wireless Local Area Network) compliant module or a Bluetooth-compliant module, which is capable of linking via wireless channel to the wireless network access point 20 for the purpose of linking the network-based wireless telephone communication device of the invention 100 via the wireless network access point 20 to the Internet 30. Since WLAN and Bluetooth are both well-known wireless communication protocols in the information industry, detailed description thereof will not be given here in this specification.

The callee specifying module 130 is coupled to the user interface module 110 to allow the user to utilize the user interface module 110 to specify the network ID of each callee whom the user wants to talk with. The user can specify one or more callees at the same time. This task can be done by either selecting each desired network ID from a prestored list, or directly inputting each desired network ID via the keypad 11.

The instant interactive voice conferencing control module 140 is, for example, an ICQ program, an MSN Messenger program, a Yahoo Messenger program, or an equivalent program, which is capable of controlling the interactive multi-person voice communication session between the portable information platform 10 and the network-linked voice communication platforms 41, 42, 43 when the portable information platform 10 is linked through the wireless network interface module 120 and the wireless network access point 20 and via the Internet 30 to each of the network-linked voice communication platforms 41, 42, 43 whose respective network IDs are specified by the callee specifying module 130.

The input-voice processing module 150 is externally coupled to a microphone 151 used to pick up the user's natural voice, and which is capable of converting the user's natural voice into digital voice signals in a specific format.

The output-voice processing module 160 is externally coupled to a loudspeaker 161, and which is capable of receiving each callee's returned digital voice signals from the instant interactive voice conferencing control module 140 that are received through the wireless network interface module 120 and the wireless network access point 20 and via the network system 30 from each of the network-linked voice communication platforms 41, 42, 43, and then converting each callee's returned digital voice signals into analog signals that can be reproduced through the loudspeaker 161 into natural voice.

During practical application, when the user wants to talk with one or more persons via the portable information platform 10 (in the following example, assume the user wants to talk with 3 persons at the same time), the user needs first to utilize the user interface module 110 to activate the network-based wireless telephone communication device of the invention 100 for linking by way of the wireless network interface module 120 to the wireless network access point 20 for connection to the Internet 30. When the portable information platform 10 is successfully connected to the Internet 30, the user can then utilize the callee specifying module 130 to specify the respective network IDs of the callees whom the user wants to talk with, and this action will activate the instant interactive voice conferencing control module 140 (which is ICQ, MSN Messenger, Yahoo Messenger, or an equivalent program) to establish a link via the Internet 30 to each callee's network-linked voice communication platform 41, 42, 43.

As the portable information platform 10 is successfully linked to each of the network-linked voice communication platforms 41, 42, 43, the user can then speak against the microphone 151, which will activate the input-voice processing module 150 to convert the user's natural voice message into digital voice signals in a specific format for the instant interactive voice conferencing control module 140 to send the digital voice signals by way of the wireless network interface module 120 and the wireless network access point 20 and via the Internet 30 to all of the network-linked voice communication platforms 41, 42, 43, allowing the user's voice to be broadcast to all the callees through their network-linked voice communication platforms 41, 42, 43. Each callee can also talk back to the user via the mobile phone 41, the notebook computer 42, or the desktop computer 43.

Reversely, each callee's voice will be transferred back in digital form via the network-linked voice communication platforms 41, 42, 43 and by way of the Internet 30 and the wireless network access point 20 to the user's portable information platform 10, which is then received and demodulated by the wireless network interface module 120 into digital voice signals and then forwarded by the instant interactive voice conferencing control module 140 to the output-voice processing module 160 for reproduction through the loudspeaker 161 into natural voice for the user to hear the callee's returned voice message.

In conclusion, the invention provides a network-based wireless telephone communication device, which can be either an independent device or integrated to a portable information platform, for the purpose of providing an interactive multi-person voice communication session for the user to talk with one or more other persons via voice over the Internet. Since the invention utilizes the Internet for voice data transmission, it is significantly more economical to use than mobile phone. Moreover, since the invention can be either an independent device or integrated to a portable information platform, such as mobile phone, electronic dictionary, PDA, or the like, it has a higher level of portability than notebook computer with wireless linking capability. The invention is therefore more advantageous to use than prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A network-based wireless telephone communication device, which is linkable by way of a wireless network access point to a network system for providing an interactive multi-person voice communication session with one or more remotely-located network-linked voice communication platforms;

the network-based wireless telephone communication device comprising:

a user interface module, which allows user-initiated control to the network-based wireless telephone communication device;

a wireless network interface module, which is capable of linking in a wireless manner to the wireless network access point for connection to the network system;

a callee specifying module, which allows user to specify each callee's network ID;

an instant interactive voice conferencing control module, which is capable of controlling an interactive multi-person voice communication session between the network-based wireless telephone communication device and each network-linked voice communication platform whose network ID is specified by the callee specifying module;

an input-voice processing module, which is capable of receiving the user's natural voice and converting the user's natural voice into digital voice signals for the instant interactive voice conferencing control module to send the digital voice signals by way of the wireless network interface module and the wireless network access point and via the network system to each network-linked voice communication platform whose network ID is specified by the callee specifying module; and an output-voice processing module, which is capable of receiving each callee's returned digital voice signal from the instant interactive voice conferencing control module that is sent back by way of the network system and the wireless network access point to the wireless network interface module from each callee's network-linked voice communication platform, and which is further capable of converting each callee's returned digital voice signal into natural voice.

2. The network-based wireless telephone communication device of claim 1, which is integrated to a portable information platform.

3. The network-based wireless telephone communication device of claim 2, wherein the portable information platform is a mobile phone.

4. The network-based wireless telephone communication device of claim 2, wherein the portable information platform is an electronic dictionary.

5. The network-based wireless telephone communication device of claim 2, wherein the portable information platform is a PDA (Personal Digital Assistant).

6. The network-based wireless telephone communication device of claim 1, wherein the network system is Internet.

7. The network-based wireless telephone communication device of claim 1, wherein the wireless network interface module is a WLAN-compliant module.

8. The network-based wireless telephone communication device of claim 1, wherein the wireless network interface module is a Bluetooth-compliant module.

9. The network-based wireless telephone communication device of claim 1, wherein the instant interactive voice conferencing control module is an ICQ program.

10. The network-based wireless telephone communication device of claim 1, wherein the instant interactive voice conferencing control module is an MSN Messenger program.

11. The network-based wireless telephone communication device of claim 1, wherein the instant interactive voice conferencing control module is a Yahoo Messenger program.

* * * * *